United States Patent
Reinauer et al.

(10) Patent No.: US 11,639,791 B2
(45) Date of Patent: May 2, 2023

(54) DECORATIVE ITEM WITH A LIGHT EFFECT

(71) Applicant: The Swatch Group Research and Development Ltd, Marin (CH)

(72) Inventors: Olga Reinauer, Neuchatel (CH); Agnes Marlot Doerr, Neuchatel (CH); Nicolas Francois, Neuchatel (CH); Pierpasquale Tortora, Neuchatel (CH); Stewes Bourban, Chabrey (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/930,827

(22) Filed: Jul. 16, 2020

(65) Prior Publication Data

US 2021/0088209 A1 Mar. 25, 2021

(30) Foreign Application Priority Data

Sep. 20, 2019 (EP) ..................................... 19198752

(51) Int. Cl.
*F21V 33/00* (2006.01)
*F21V 8/00* (2006.01)
(Continued)

(52) U.S. Cl.
CPC ........ *F21V 33/0008* (2013.01); *G02B 6/0008* (2013.01); *F21W 2121/06* (2013.01);
(Continued)

(58) Field of Classification Search
CPC .. G02B 6/0008; G01D 5/34723; G01D 11/28; B60K 2370/332; B60K 2370/336;
(Continued)

(56) References Cited

U.S. PATENT DOCUMENTS 3,433,940 A * 3/1969 Alfred .................. G02B 6/0008
362/23.16
4,274,154 A 6/1981 Dostoomian et al.
(Continued)

FOREIGN PATENT DOCUMENTS

| CH | 704 684 A2 | 9/2012 |
|---|---|---|
| CN | 2153821 Y | 1/1994 |

(Continued)

OTHER PUBLICATIONS

Machine translation of DE 102015121006 A1, Espacenet. (Year: 2021).*
(Continued)

*Primary Examiner* — Colin J Cattanach
(74) *Attorney, Agent, or Firm* — Oblon, McClelland, Maier & Neustadt, L.L.P.

(57) ABSTRACT

A decorative item including an element made at least partly of a metallic, polymeric or ceramic based material and including a face visible to an observer, at least one light source external or internal to the element, the decorative item further includes at least one optical fibre embedded in the material of the element, the optical fibre serving as a guide for the light from the light source in order to produce, during use, a light effect on the visible face of the element. A method for manufacturing the decorative item is also disclosed.

11 Claims, 3 Drawing Sheets

(51) Int. Cl.
| | |
|---|---|
| *F21W 121/06* | (2006.01) |
| *G04B 19/30* | (2006.01) |
| *G01D 11/28* | (2006.01) |
| *G01D 5/347* | (2006.01) |
| *G09F 13/02* | (2006.01) |
| *G09F 9/305* | (2006.01) |

(52) U.S. Cl.
CPC ......... *G01D 5/34723* (2013.01); *G01D 11/28* (2013.01); *G04B 19/30* (2013.01); *G09F 9/305* (2013.01); *G09F 13/02* (2013.01); *G09F 2009/3055* (2013.01)

(58) Field of Classification Search
CPC .......... B60K 2370/339; B60K 2370/34; B60K 2370/341; B60K 2370/343; B60K 2370/345; G09F 13/02; G09F 9/305; G09F 2009/3055; G04B 19/30
See application file for complete search history.

(56) References Cited

U.S. PATENT DOCUMENTS

| | | | | |
|---|---|---|---|---|
| 4,296,562 | A * | 10/1981 | Sanborn | G09F 9/305 345/48 |
| 4,771,368 | A * | 9/1988 | Tsukamoto | G01D 11/28 362/23.01 |
| 5,101,466 | A * | 3/1992 | Reidinger | G02B 6/0008 385/147 |
| 6,082,886 | A * | 7/2000 | Stanford | F21V 33/006 362/153.1 |
| 6,183,099 | B1 * | 2/2001 | Garay | G01D 11/28 362/23.15 |
| 6,198,872 | B1 * | 3/2001 | Lipson | G09F 9/305 385/115 |
| 6,234,657 | B1 * | 5/2001 | Shih | G02B 6/0008 362/554 |
| 6,471,387 | B1 * | 10/2002 | Henshaw | G02B 6/0006 362/555 |
| 10,175,653 | B1 | 1/2019 | Bloom et al. | |
| 11,009,652 | B2 * | 5/2021 | Mouskeftaras | G02B 6/003 |
| 2002/0101738 | A1 * | 8/2002 | Misaras | B60Q 3/14 362/487 |
| 2005/0111239 | A1 * | 5/2005 | Hosobuchi | G04B 19/30 362/617 |
| 2006/0039244 | A1 | 2/2006 | Gyger et al. | |
| 2007/0103924 | A1 * | 5/2007 | Lath | G02B 6/0008 362/551 |
| 2009/0059615 | A1 * | 3/2009 | Wainright | G02B 6/0008 362/555 |
| 2010/0299982 | A1 * | 12/2010 | Yu | G09F 9/305 362/559 |
| 2013/0227899 | A1 * | 9/2013 | Yu | G09F 9/305 52/173.1 |
| 2014/0160792 | A1 * | 6/2014 | Chen | G02B 6/0036 362/610 |
| 2014/0286039 | A1 * | 9/2014 | Sigler | F21V 3/049 362/555 |
| 2015/0216268 | A1 * | 8/2015 | Zalon | G09F 13/04 40/1.5 |
| 2015/0311939 | A1 * | 10/2015 | Zalon | H04B 1/3888 455/575.6 |
| 2015/0370007 | A1 * | 12/2015 | Wells | B29D 11/00663 264/1.24 |
| 2017/0316264 | A1 * | 11/2017 | Gustafsson | G06F 3/013 |
| 2018/0361920 | A1 * | 12/2018 | Birman | B60K 37/02 |
| 2019/0248240 | A1 * | 8/2019 | Fujita | B60K 35/00 |

FOREIGN PATENT DOCUMENTS

| | | | | |
|---|---|---|---|---|
| CN | 202496535 | U | 10/2012 | |
| CN | 203533351 | U | 4/2014 | |
| CN | 205776888 | U | 12/2016 | |
| DE | 102013211276 | B3 * | 9/2014 | ........... G02B 6/0008 |
| DE | 102015121006 | A1 * | 6/2017 | ............... B60Q 3/62 |
| EP | 1 626 316 | A1 | 2/2006 | |
| EP | 2615366 | A1 * | 7/2013 | ............... E01F 9/547 |
| EP | 2628627 | A1 * | 8/2013 | ............... B60K 37/00 |
| FR | 2860282 | A1 * | 4/2005 | ........... G02B 6/0008 |
| JP | 56-25278 | | 3/1981 | |
| JP | 62-44379 | | 11/1987 | |
| JP | 2006-53150 | A | 2/2006 | |
| KR | 1992-0018530 | | 10/1992 | |
| KR | 20170111863 | A * | 10/2017 | |

OTHER PUBLICATIONS

European Search Report dated Mar. 24, 2020 in European Application 19198752.8 filed Sep. 20, 2019 (with English Translation of Categories of Cited Documents), 4 pages.

Notice of the Reason for Refusal dated Aug. 10, 2021, in corresponding Japanese Patent Application No. 2020-136158 (with English translation), 8 pages.

Office Action issued Jul. 28, 2021 in Chinese Patent Application No. 202010986596.2 (with English Translation); 17 pgs.

* cited by examiner

DECORATIVE ITEM WITH A LIGHT EFFECT

CROSS-REFERENCE TO RELATED APPLICATION

This application claims priority to European Patent Application No. 19198752.8 filed on Sep. 20, 2019, the entire disclosure of which is hereby incorporated herein by reference.

FIELD OF THE INVENTION

The present invention relates to a decorative item, in particular to an external component for watchmaking or jewelry exhibiting a light effect. It also relates to the method for manufacturing the decorative item.

PRIOR ART

There are numerous items for which a particular aesthetic effect is sought. Mention can be made, in particular, of items in the field of watchmaking always seeking aesthetic improvement. Aesthetic improvement can be provided by several elements, be it colour, graphics or even a light effect via, for example, a luminescent coating. A light effect can also be provided via a light source placed inside the timepiece and intended to illuminate the dial, an index or even a hand as in Patent No. EP 2950167.

It is an object of the present invention to provide a new light effect for a decorative item and in particular for an external component for watchmaking or jewelry.

SUMMARY OF THE INVENTION

It is thus an object of the present invention to propose a decorative item comprising one or more optical fibres coated in a metallic, ceramic or polymeric based material, and intended to guide the light from one or more light sources towards a visible face of the decorative item in order to create a light effect.

Other features and advantages of the present invention will appear in the following description of a preferred embodiment, given by way of non-limiting example, with reference to the annexed drawings.

DETAILED DESCRIPTION

The present invention relates to an item exhibiting a light effect for decorative purposes. The decorative item may be a constituent element of watches, jewelry, bracelets, brooches, necklaces, handbags, etc. In the field of watchmaking, this item is an external component, such as a case middle, a case back, a bezel, a pusher, a bracelet link, a dial, a hand, a dial index, etc.

Figure 1A:
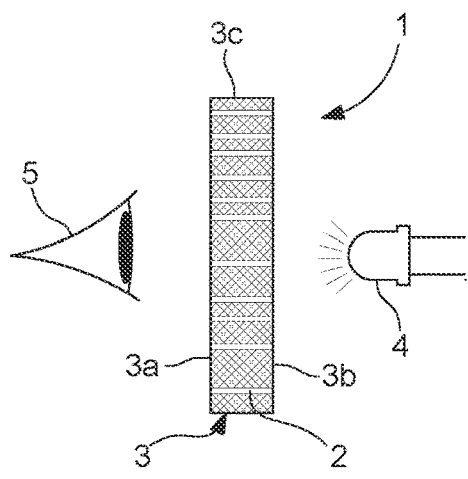
FIGS. 1a-1e schematically represent different variants of the arrangement of the light sources and optical fibres within the decorative item according to the invention.
Figure 1B:
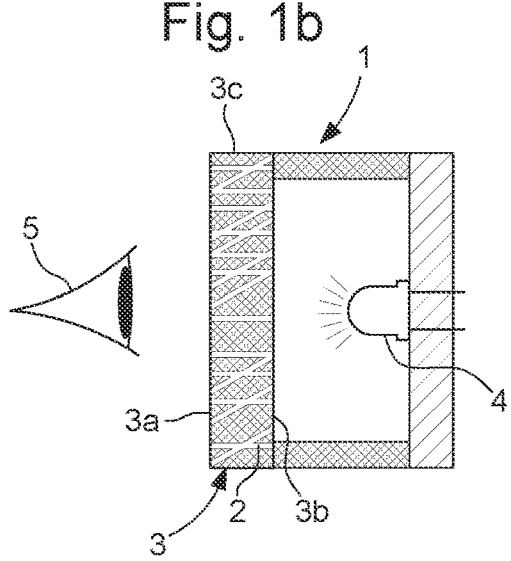
Figure 1C:
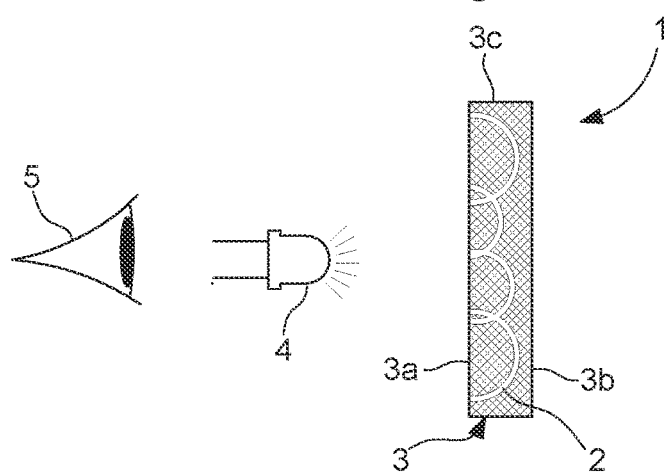
Figure 1D:
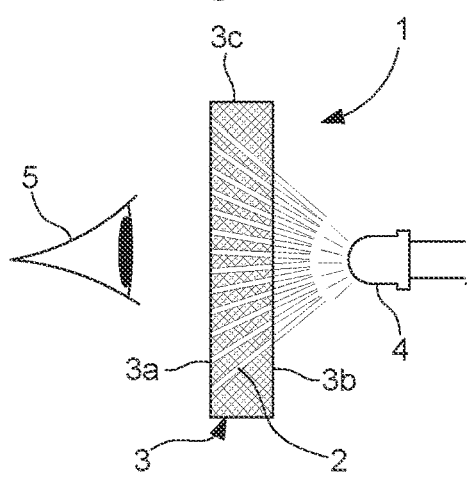
Figure 1E:
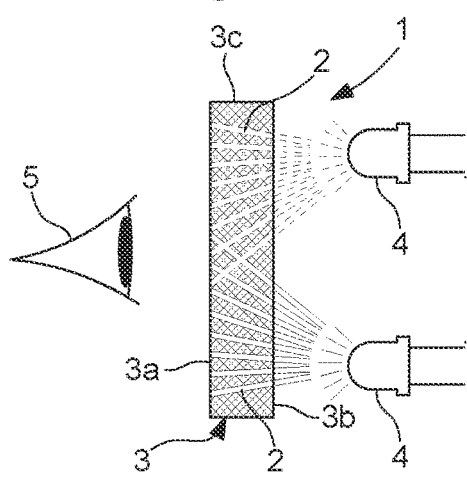

According to the invention and as schematically shown in FIGS. 1a to 1e, decorative item 1 comprises an element 3 made of a polymeric, ceramic or metallic based material in which one or more optical fibres 2 are arranged. For the sake of simplicity, reference will be made hereinafter to optical fibres in the plural. Decorative item 1 also comprises at least one light source 4 external or internal to element 3. Optical fibres 2 emerge on at least one visible face 3a, i.e. a face directed towards observer 5, of element 3. It is not, however, inconceivable for one end of the fibres to emerge in proximity to the visible face if the element has a surface made of a transparent material. 'In proximity to' means a distance less than or equal to 2 mm below the visible face. The optical fibres can be either standard optical fibres, or fluorescent optical fibres which produce a colour during illumination. The fibres serve as waveguides for the light emitted by light source or sources 4. The light source is an element that emits photons through the phenomena of photoluminescence, electroluminescence or chemiluminescence. Thus, this may be light emitting diodes (LEDs), fluorescent sources, etc. Optical fibres 2 can be directly connected to light source 4 as illustrated in FIGS. 1d and 1e or exposed to light source 4 with no direct connection as illustrated in FIGS. 1a-1c. According to a variant that is not represented, the light can also be guided from the source to the fibres via a waveguide, for example, arranged inside the element.

Figure 2:
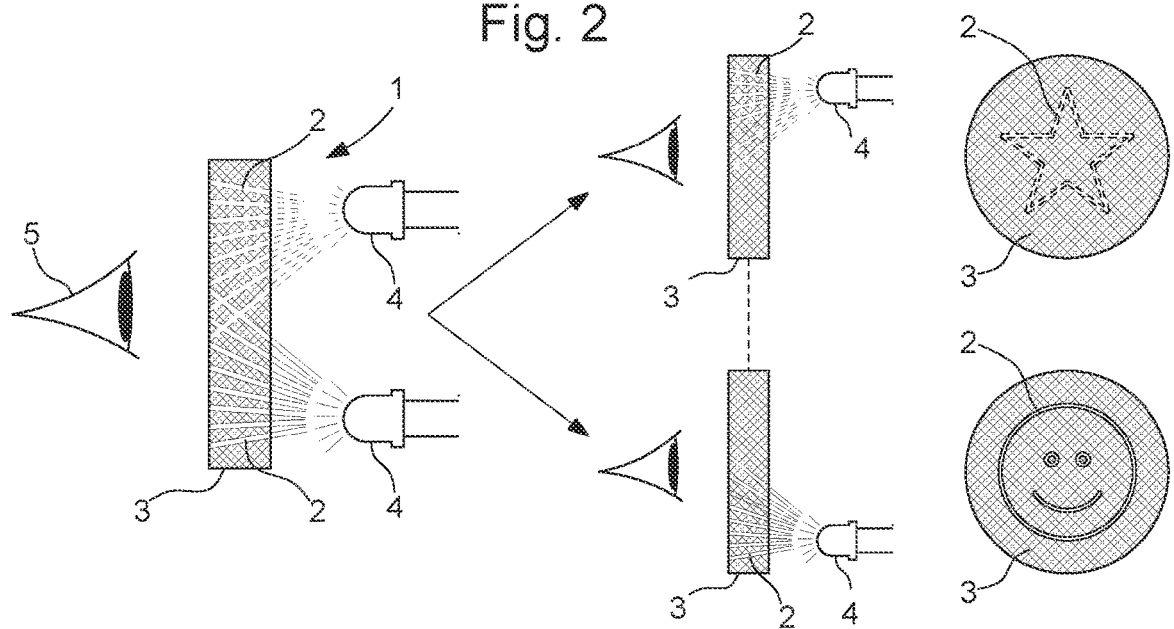
FIG. 2 schematically represents the light effects that can be obtained with the variant of FIG. 1e.

Within the material of element 3, optical fibres 2 can pass from a first face 3b through to a second face which is the visible face 3a of element 3 as schematically represented in FIGS. 1a-b and 1d-e, the first and second faces may be opposite (configuration shown) or contiguous (configuration not shown). When fibres 2 pass right through, light source 4 is arranged on the side of the first face 3b or 3c of the element. In a variant, both ends of fibres 2 can emerge onto visible face 3a as represented in FIG. 1c. In such case, light source 4 is on the side of visible face 3a. The optical fibres emerge onto the visible face forming a set of light dots which, depending on the arrangement of the fibres, may form a given shape or logo, for example a star or a smiley in the examples of FIG. 2. This shape or logo will be more generally referred to as a decoration.

The optical fibres are embedded in the material and can adopt various orientations within the material. According to the variant of FIG. 1a, they are all oriented in the same direction substantially perpendicular to visible face 3a of the element. In the illustrated example, they are oriented parallel to the axis between light source 4 and the observer 5. In FIG. 1b, they are each oriented differently at an angle of less than 90° with respect to this axis which makes it possible to create an aesthetic effect that varies according to the viewing angle. In a variant in FIG. 1c, fibres 2 are bent with both ends emerging onto visible face 3a. In the configurations of FIGS. 1d and 1e, fibres 2 pass right through with one or more light sources 4 connected to fibres 2. In FIG. 1d, all of fibres 2 are connected to one light source 4. In FIG. 1e, one part of fibres 2 is connected to a light source 4 and the remaining part of fibres 2 is connected to another light source 4. Thus, with several light sources connected to the optical fibres, different coloured images can be produced. Also, with alternate operation of the light sources, successive images can appear as shown schematically in FIG. 2.

Figure 3A:
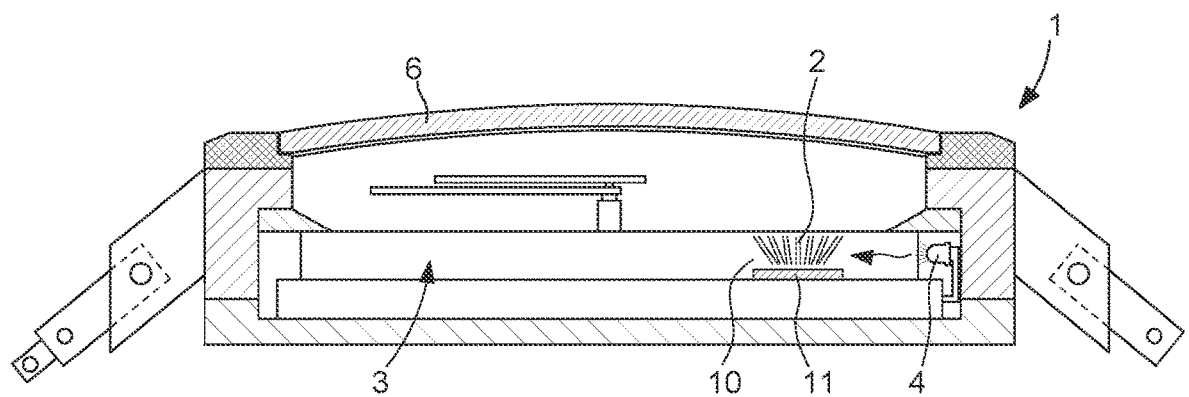
FIGS. 3a and 3b schematically represent a cross-section of a timepiece according to the invention comprising a dial in which the optical fibres are embedded respectively for two distinct arrangements of the light source.
Figure 3B:
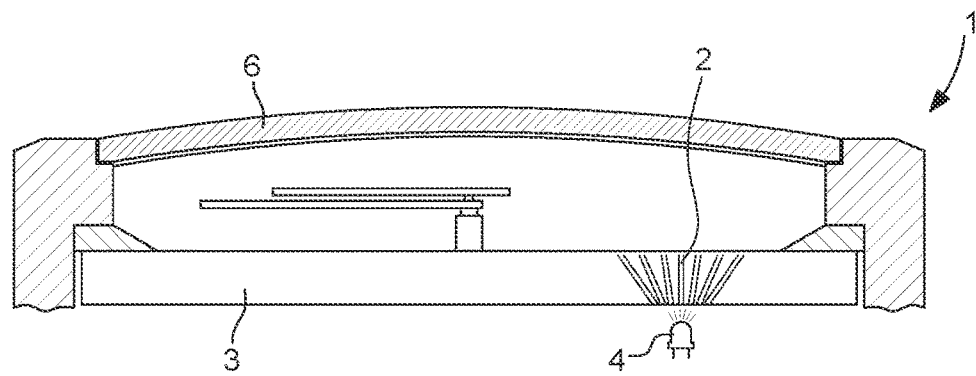
Figure 3C:
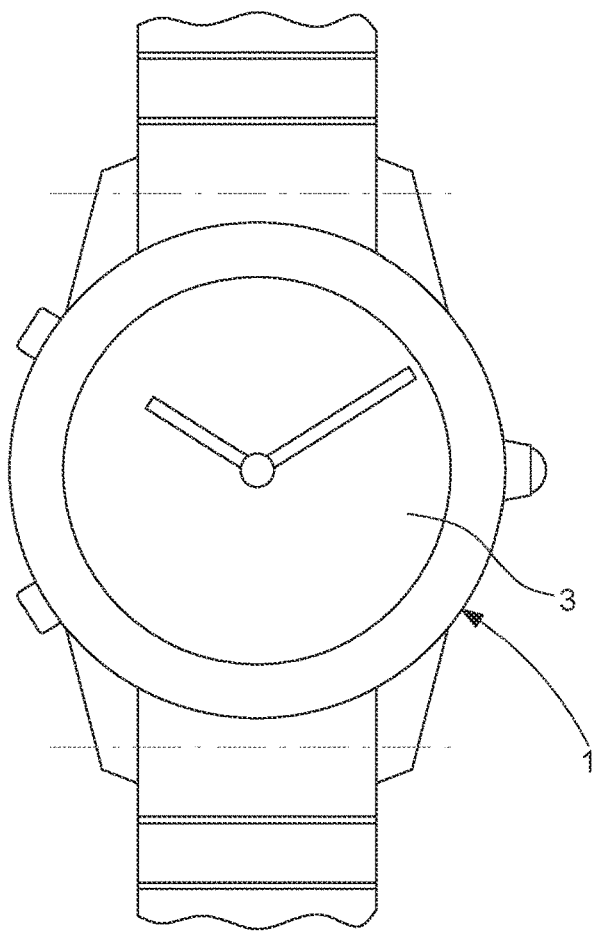
FIG. 3c schematically represents a top view of a timepiece according to the invention.

For example, element 3 can be a dial with optical fibres 2 set in the material of the dial to form a picture. Light sources such as LEDs, connected to the optical fibres set in the material, are placed under the dial. When the LEDs light up alternately, different images are visible to the observer. Likewise, an animation can be created on the dial. By way of example, FIGS. 3a and 3b represent different arrangements of light source 4 under dial 3 in which optical fibres 2 are embedded. In FIG. 3a, light source 4 is arranged opposite a lateral face of dial 3. The light is transmitted from source 4 towards fibres 2 via a waveguide 10 arranged in dial 3. Waveguide 10 can be provided with a reflector 11 on its lower face opposite optical fibres 2 in order to reflect the light towards the fibres. In FIG. 3b, light source 4 is arranged under dial 3 and in particular on the periphery of the dial. It is directly connected to optical fibres 2. In the examples, a single light source is represented. According to variants, it is possible to envisage providing 2, 3, 4, 5 etc. light sources. According to the invention, the light sources are connected to a power source such as a cell battery arranged in the decorative item, for example with a manually operated control member, arranged on the outside of the decorative item.

In the illustrated examples, the light source is external to the element. It is, however, also possible to envisage positioning the light source inside the element. In such case, it is not necessary to make both ends of the fibre emerge onto an external face of the element. It is, for example, possible to envisage overmoulding the light source in the element. By way of illustration, in the field of watchmaking, the light source can be overmoulded in the external component, for example a bracelet link, comprising the fibres. It is also possible, as disclosed in Patent EP 2950167, to envisage integrating the light source in a housing arranged in a hand forming the element in which the optical fibres are embedded.

Preferably, the optical fibres are embedded in a polymer matrix. By way of example, the polymer can be chosen from among epoxy, acrylic, phenolic, ester, polyurethane resins, etc. The polymer matrix optionally comprises fillers making it possible to change the mechanical properties of the material, the colour, density of the material, to make the material luminescent and/or to opacify the polymer if necessary. These fillers are, inter alia, inorganic fillers such as metallic or ceramic powders, added in an amount between 20% and 90% by mass, they are intended to increase the density of the material and to change its thermal conductivity; glass fibres added in an amount between 10% and 50% by mass in order to increase the dimensional stability of the material or organic fillers such as plant fibres (cellulose, linen, hemp, . . . ) or animal fibres (leather, wool . . . ) added in an amount between 5% and 50% by mass, they make it possible to give the material a natural appearance and to recycle waste from the production of natural materials. Photoluminescent pigments can also be mentioned, added in an amount between 10% and 90% by mass (for example lanthanide doped strontium aluminates) to the resin to obtain luminescence in the dark after charging the material in the light. The polymer matrix can thus comprise one or other of the fillers, alone or in combination provided that the percentage by mass of the fillers does not exceed 90% by mass of the polymer matrix. Preferably, the polymer matrix will comprise at least the inorganic filler.

Figure 4:
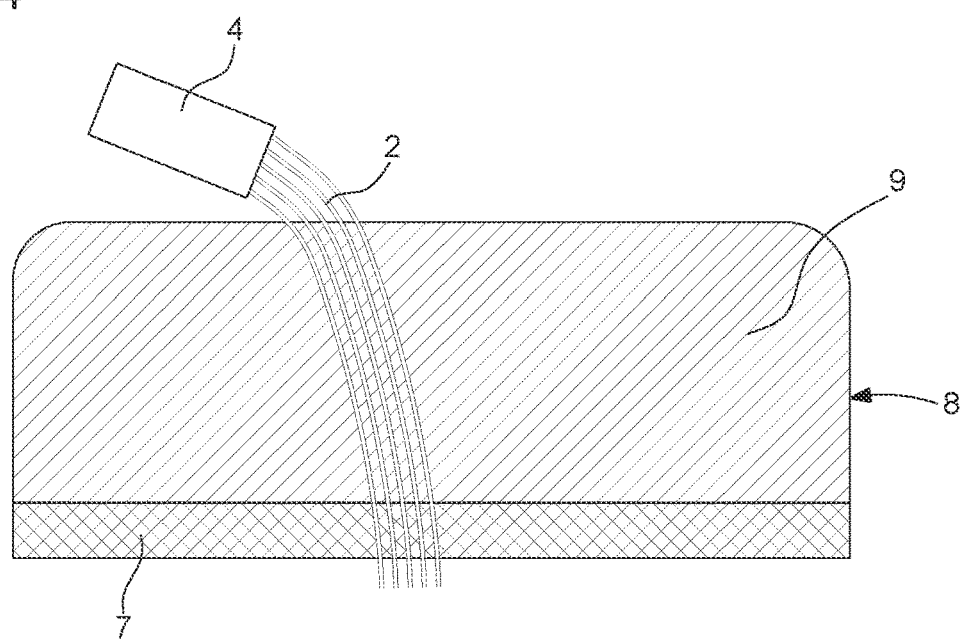
FIG. 4 schematically illustrates the steps of the method for manufacturing the decorative item exhibiting a light effect according to the invention.

To make the material, the optical fibres are integrated in the mixture comprising the organic binder, i.e. the aforementioned resin, and any fillers. In an example application illustrated in FIG. 4, the material is produced by vacuum casting in a mould 8 having the shape of the element. In a step a), a quick set resin 7, which will be referred to as adhesive, is poured into the bottom of mould 8. This resin, can, for example, be an epoxy resin which will subsequently be removed when the part is machined and polished. This layer of adhesive which, by way of example, has a thickness on the order of a millimetre, forms a sacrificial area for positioning the optical fibres. Once the sacrificial area has been removed, the bare surface will form the face intended to be visible with the light effect. Alternatively, instead of the sacrificial resin, a plate with an array of micro-holes, which make it possible to position the fibres and which form a decoration, is provided. The pattern will appear illuminated when the light source is switched on. The plate can be sacrificial or kept in the material. In a step b), optical fibres 2 are positioned in the bottom of the mould to produce the desired pattern. Resin 7 in which the base of fibres 2 is embedded is polymerized. In a step c), the fibres are cut to the desired size so that they emerge onto or in proximity to the visible face on the finished element. When the fibres are intended to be directly connected to light sources, in this step, they are twisted and bonded together to form one or more strands respectively connected to one or more light sources 4. In a step d), resin 9 forming the polymer matrix of the material is cast with the desired fillers in the mould cavity to overmould the optical fibres. In step e), the resin is crosslinked, and the assembly is removed from the mould after the curing time. In step f), sacrificial resin layer 7 or the plate as appropriate is removed by machining.

It will be noted that, alternatively, the optical fibres can be embedded in an amorphous metal or crystalline matrix via a process of injecting, on the fibres positioned in the mould, a feedstock comprising a metallic powder and an organic binder system (paraffin, polyethylene, etc.). After injection, the feedstock is debound by thermal degradation or by dissolution in a solvent before being sintered. The fibres are then made of a material such as quartz which is resistant to the sintering temperatures of the metal.

The optical fibres can also be embedded in a ceramic matrix based on nitrides, oxides and/or carbides. The ceramic powders optionally mixed with an organic binder system (paraffin, polyethylene, etc.) are injected or pressed into the mould comprising the fibres before being sintered. The fibres are then also made of a material resistant to the sintering temperatures of the ceramic.

KEY (1) Decorative item
(2) Optical fibre
(3) Element or dial
   a. Visible face
   b. Face opposite the visible face
   c. Face joined to the visible face
(4) Light source
(5) Observer
(6) Crystal
(7) Support, also referred to as the sacrificial resin
(8) Mould
(9) Material or resin
(10) Waveguide
(11) Reflector

The invention claimed is:

1. A decorative item, comprising:
   an element made at least partly of a metallic, polymeric, or ceramic based material and comprising a face visible to an observer;

at least one light source external to and placed lateral to said element;

at least one optical fiber;

a waveguide coupling the at least one optical fiber and the at least one light source; and a reflector on a lower face of the waveguide configured to reflect light from the at least one light source to the at least one optical fiber, wherein the at least one optical fiber is embedded in said material of the element, said optical fiber serving as a guide for the light from the light source in order to produce, during use, a light effect on the visible face of the element, said at least one optical fiber comprises at least two pluralities of optical fibers and is connected to a plurality of the light sources, and each plurality of optical fibers, of the at least two pluralities of optical fibers, is connected to a corresponding light source of the plurality of the light sources and oriented differently from each other and correspondingly produces the light effect including an animation having a different shape to a same said observer at a same time on the visible face.

2. The decorative item according to claim 1, wherein said optical fiber emerges at one end onto the visible face or in proximity to the visible face of the element and at the other end thereof onto the same visible face or in proximity to said same visible face of the element.

3. The decorative item according to claim 1, wherein said optical fiber emerges at one end onto the visible face or in proximity to the visible face of the element and at the other end thereof onto a face contiguous with the visible face.

4. The decorative item according to claim 1, wherein said optical fiber emerges at one end onto the visible face or in proximity to the visible face of the element and at the other end thereof onto a face opposite to the visible face.

5. The decorative item according to claim 1, wherein the at least two pluralities of optical fibers form decorations on the visible face of the element.

6. The decorative item according to claim 5, wherein the decorative item comprises at least two light sources respectively intended during use to form on the visible face of the element decorations that differ from each other in shape or in color.

7. The decorative item according to claim 1, wherein each optical fiber of one of the at least two pluralities of optical fibers is oriented in a direction substantially perpendicular to the visible face of the element.

8. The decorative item according to claim 1, wherein each optical fiber of one of the at least two pluralities of optical fibers is oriented at an angle of less than 90° with respect to a direction substantially perpendicular to the visible face of the element.

9. The decorative item according to claim 1, wherein the element is an external component for watchmaking or jewelry chosen from a list including a case middle, a case back, a bezel, a pusher, a bracelet link, a dial, a hand and a dial index.

10. The decorative item according to claim 9, wherein the element is the dial.

11. The decorative item according to claim 1, wherein the reflector and the waveguide are placed in the element.

* * * * *